D. HINDAHL.
CONVERTIBLE BALLAST CAR.
APPLICATION FILED NOV. 8, 1919.
1,374,568.
Patented Apr. 12, 1921.
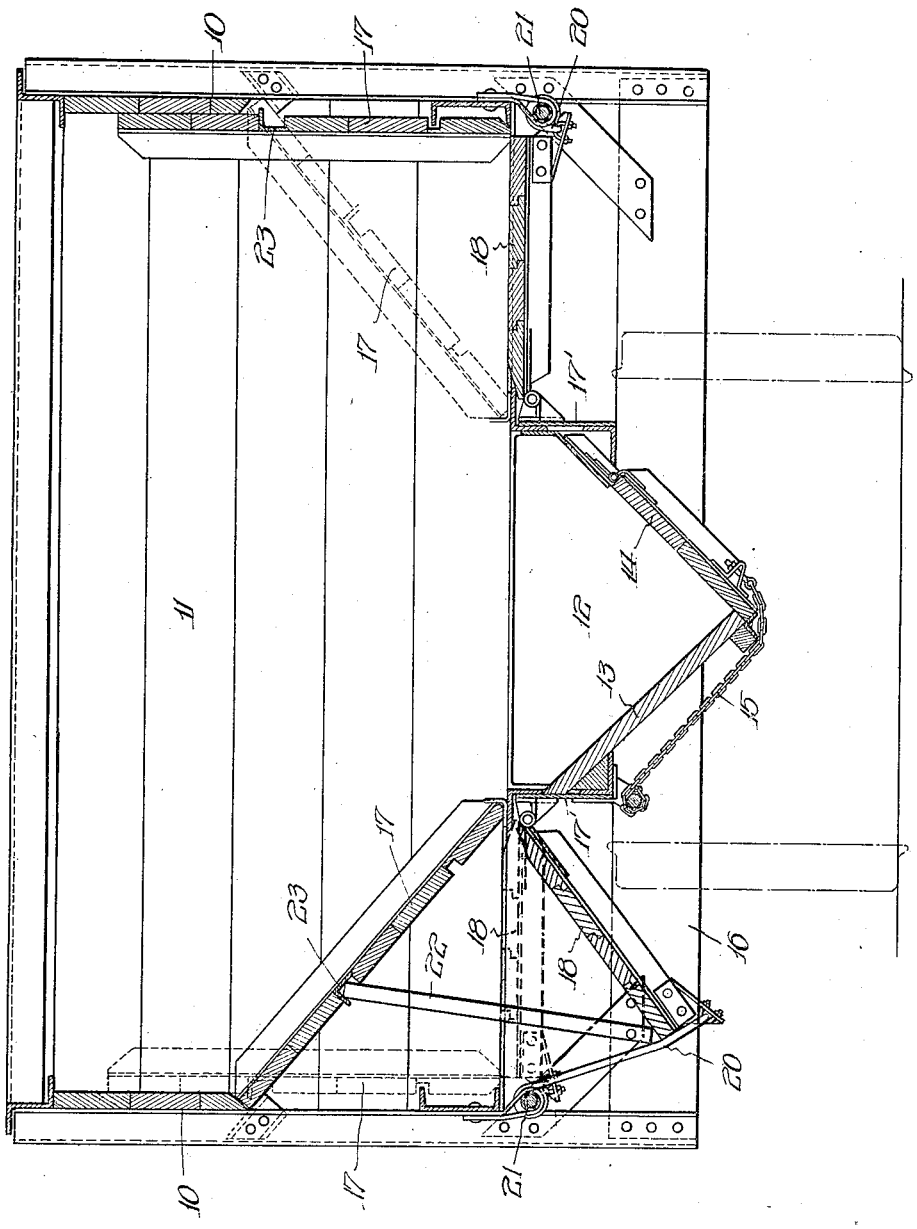

UNITED STATES PATENT OFFICE.

DAVID HINDAHL, OF CHICAGO, ILLINOIS, ASSIGNOR TO RODGER BALLAST CAR COMPANY, OF CHICAGO, ILLINOIS, A CORPORATION OF MAINE.

CONVERTIBLE BALLAST-CAR.

1,374,568.     Specification of Letters Patent.     Patented Apr. 12, 1921.

Application filed November 8, 1919. Serial No. 336,576.

*To all whom it may concern:*

Be it known that I, DAVID HINDAHL, a citizen of the United States, residing at Chicago, in the county of Cook and State of Illinois, have invented certain new and useful Improvements in Convertible Ballast-Cars, of which the following is a specification.

This invention relates to convertible ballast cars.

In my co-pending application Serial No. 278,333, filed February 21, 1919, I have disclosed a convertible ballast car having a plurality of convertible parts the positions of which are changed in converting the car from a flat bottom car to a center hopper or center dump car, and vice versa. On referring to such application it will be noted, among other things, that there are convertible side members which when the car is arranged as a center dump car, are in inclined positions; said members extending downwardly and inwardly from the sides of the car toward the center thereof to form central hopper side walls. When the car is arranged as a flat bottom car, these same convertible members are in vertical positions to form side walls of the car. These convertible members are large and heavy. Accordingly, it is extremely difficult and burdensome to lift said members manually from their inclined to their vertical positions.

Therefore, one object of my invention is to facilitate the shifting of these convertible members in a simple and novel manner.

Another object is to provide means whereby such a convertible member may be shifted from one position to another by means of its operative association with a power-actuated door.

These and other objects are accomplished by means of the arrangement disclosed on the accompanying sheet of drawings, in which the single figure is a transverse sectional view of a convertible ballast car embodying my invention.

For a complete description of the various parts of the car proper, attention is directed to my co-pending application hereinabove referred to. Only such parts will be described herein as relate particularly to the invention here involved.

Referring to the single figure of the drawing, it will be noted that I have shown a convertible ballast car having sides 10, ends 11 and a bottom including a central hopper 12, the walls of which below the floor line are formed by an inclined stationary wall 13 and a normally inclined movable wall 14 in the form of a door by means of which the load may be dumped centrally of the car. This door may be provided with any suitable operating mechanism 15. In this particular instance the car sides below the floor line are connected by rigid transverse frame members 16, the longitudinally extending sills 17' being mounted thereon. The sides of the car above the floor line include convertible members 17 which when they are in their vertical positions form side walls of the car, as shown in full lines at the right-hand side of the figure and in dotted lines at the left-hand side of the figure. These members are arranged in their vertical positions when the bottom of the car is a flat bottom, that is to say, when the central hopper 12 is covered by means of any suitable members, such as disclosed in my said co-pending application. When the car is arranged as a center dump car the members which cover the hopper when the car is arranged as a flat bottom car are removed to perform other functions. Also when the car is arranged as a center dump car the convertible members 17 are shifted from their vertical positions into inclined positions, as shown in full lines at the left-hand side of the figure and in dotted lines at the right-hand side of the figure. When the convertible members 17 are in their inclined positions extending downwardly and inwardly from the sides of the car toward the center thereof, said members form central hopper side walls. These convertible members 17, as mentioned hereinabove, are large and heavy, and accordingly it is extremely difficult and burdensome to lift or shift the convertible members 17 from their inclined positions to their vertical positions. Accordingly, I have provided means whereby said convertible members may be shifted automatically and by power other than manual, by means of their operative association with dump doors forming a part of the bottom or floor of the car. The doors 18 referred to are side dump doors which are pivotally connected at their inner ends to the sill members 17'. As is understood in the art, these side dump doors are operative to dump a load to the side of the tracks primarily when the car is arranged as a flat bottom car, although in my co-pending application, Serial No. 278,333, filed February 21, 1919, I have shown an arrangement whereby the load may be dumped to the sides of the car when the latter is arranged as a central hopper or center dump car. Each of these side dump doors 18 is raised into its horizontal or closed position by any suitable door operating mechanism, which in this particular case includes a cable 20, the lower end of which is operatively secured to the outer end of its associated door 18, the other end of the cable 20 in each instance being operatively secured to a rotatable shaft 21 which may be rotated in any suitable manner. In my present arrangement I provide an operative connection or connections between the side dump doors 18 and the convertible side members 17, so that the convertible side members may be shifted or lifted from their inclined positions to their vertical positions. In this particular arrangement I have shown a rigid member 22 which is insertible between the outer edge of the side dump door 18 and a bracket 23 carried by said convertible member 17. The lower end of the rigid connecting member 22 preferably engages the cable 20 in order that it may be properly retained in operative position. By means of this arrangement it is apparent that as the side dump door 18 is raised from its lower or open position into its raised or closed position, with the rigid member 22 interposed between said door and the convertible member 17 while the latter is in its inclined position, said inclined member will be raised into its vertical position as indicated. It will be understood that the convertible member is to be steadied during its shifting movement. This may be done either manually or by some suitable guide means. In any event, the shifting of the convertible member 17 from one position to another is of an automatic character, said member in each case being easily and quickly shifted by means of the arrangement hereinabove described.

It is my intention to cover all modifications of the invention falling within the spirit and scope of the following claims.

I claim:

1. In a convertible car having sides, ends and a bottom which may be converted from a hopper bottom to a flat bottom, each side including a convertible member movable from an inclined position in which it forms a hopper wall, to a vertical position, said bottom including a dump door, and means whereby said convertible member may be shifted through an operation of said door.

2. In a convertible car having sides, ends and a bottom which may be converted from a hopper bottom to a flat bottom, each side including a convertible member movable from one position to another for different car arrangements, said bottom including a dump door separate from said convertible member, and means whereby said convertible member may be shifted through an operation of said door.

3. In a convertible car having sides, ends and a bottom which may be converted from a hopper bottom to a flat bottom, each side including a convertible member movable from one position to another for different car arrangements, said bottom including a dump door separate from said convertible member, and a connection between said convertible member and said dump door whereby said convertible member may be shifted through an operation of said door.

4. In a convertible car having sides, ends and a bottom which may be converted from a hopper bottom car to a flat bottom car, each side including a convertible member movable from an inclined position in which it forms a hopper wall, to a vertical position, said bottom including a side dump door, and means whereby said convertible member may be shifted from its inclined position to its vertical position through an operation of said door.

5. In a convertible car having sides, ends and a bottom which may be converted from a hopper bottom to a flat bottom, each side including a convertible member movable from an inclined position in which it forms a hopper wall, to a vertical position, said bottom including a side dump door, operating mechanism for said side dump door, and means interposed between said door and convertible member whereby the latter is moved through the actuation of the former.

6. In a convertible car having sides, ends and a bottom which may have a central hopper and also be arranged as a flat bottom car, each side including a convertible member movable from an inclined position in which it forms an inclined hopper wall, to a vertical position, said bottom including a side dump door, door operating mechanism for said side door, and a rigid connection between said side dump door and said convertible member whereby the latter may be raised into its vertical position during the closing movement of said dump door.

7. In a convertible car having sides, ends and a bottom which may be converted from a hopper bottom to a flat bottom, each side including a convertible member movable from an inclined position in which it forms an inclined hopper wall, to a vertical position, said bottom including a side dump door, operating mechanism for said side dump door including a flexible member, and a rigid member connecting said convertible member with said side dump door whereby the convertible member will be moved into its vertical position during the closing movement of said door, said rigid member engaging said flexible member for maintaining the former in operative position.

Signed at Chicago, Illinois, this 4th day of November, 1919.

DAVID HINDAHL.